United States Patent
Boyd et al.

(10) Patent No.: US 7,251,691 B2
(45) Date of Patent: Jul. 31, 2007

(54) AUTONOMIC PREDICTIVE LOAD BALANCING OF OUTPUT TRANSFERS FOR TWO PEER COMPUTERS FOR DATA STORAGE APPLICATIONS

(75) Inventors: Kenneth Wayne Boyd, Tucson, AZ (US); Kenneth Fairclough Day, III, Tucson, AZ (US); Philip Matthew Dudas, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 10/618,400

(22) Filed: Jul. 11, 2003

(65) Prior Publication Data

US 2005/0021591 A1  Jan. 27, 2005

(51) Int. Cl.
  *G06F 15/173* (2006.01)
(52) U.S. Cl. ..................................... 709/224
(58) Field of Classification Search ................. 709/224
  See application file for complete search history.

(56) References Cited

U.S. PATENT DOCUMENTS

| | | | |
|---|---|---|---|
| 5,367,669 A | 11/1994 | Holland et al. | 395/575 |
| 5,459,857 A | 10/1995 | Ludlam et al. | 395/182.04 |
| 5,542,066 A | 7/1996 | Mattson et al. | 395/463 |
| 5,557,770 A | 9/1996 | Bhide et al. | 395/488 |
| 6,073,209 A | 6/2000 | Bergsten | 711/114 |
| 6,275,898 B1 | 8/2001 | DeKoning | 711/114 |
| 6,363,462 B1 | 3/2002 | Bergsten | 711/162 |
| 6,560,717 B1 * | 5/2003 | Scott et al. | 714/4 |
| 6,606,643 B1 * | 8/2003 | Emens et al. | 709/203 |
| 7,035,922 B2 * | 4/2006 | Parham | 709/224 |
| 7,047,379 B2 * | 5/2006 | Boyd et al. | 711/162 |
| 7,096,263 B2 * | 8/2006 | Leighton et al. | 709/224 |
| 7,107,420 B2 * | 9/2006 | Boyd et al. | 711/162 |
| 7,116,639 B1 * | 10/2006 | Gail et al. | 370/252 |
| 2002/0129134 A1 * | 9/2002 | Leighton et al. | 709/223 |
| 2002/0199060 A1 * | 12/2002 | Peters et al. | 711/114 |
| 2003/0055971 A1 * | 3/2003 | Menon | 709/226 |
| 2005/0021575 A1 * | 1/2005 | Boyd et al. | 707/205 |

OTHER PUBLICATIONS

RD 443125; Mar. 2001; pp. 464-465.
IBM TDB, vol. 24, No. 3; Aug. 1981, p. 1411.

* cited by examiner

Primary Examiner—John B. Walsh
(74) Attorney, Agent, or Firm—Kurt P. Goudy (57) ABSTRACT

Disclosed are a system, a method, and a computer program product to optimize the overall latency of transferring data from peer computers to storage devices. The latency optimization occurs after a group of data is received and organized by the peer computers. The average amount of time to transfer data to each particular storage device from the peer computers is used to determine the assignment of data transfers between the peer computers. Each peer computer maintains continuously updated measurements of the average time to transfer data to each storage device. The updated transfer time measurements are based upon a moving average with adjustable weighting of past and present measurements enabling the system to adapt to changing conditions.

24 Claims, 6 Drawing Sheets

AUTONOMIC PREDICTIVE LOAD BALANCING OF OUTPUT TRANSFERS FOR TWO PEER COMPUTERS FOR DATA STORAGE APPLICATIONS

TECHNICAL FIELD

This invention concerns a system to maintain an optimized balance of outbound transfers between two peer nodes that are transferring data to one or more storage devices.

CROSS-REFERENCES TO RELATED APPLICATIONS

The present application is related to application Ser. No. 10/618,242, entitled "Autonomic Link Optimization Through Elimination of Unnecessary Transfers" now U.S. Pat. No. 7,047,379, and to application Ser. No. 10/617,932, entitled "Autonomic Learning Method To Load Balance Output Transfers of Two Peer Nodes", both filed on an even date herewith, the disclosure of which is hereby incorporated by reference in its entirety.

BACKGROUND OF THE INVENTION

Data storage systems may maintain more than one copy of data to protect against losing the data in the event of a failure of any of the data storage components. A secondary copy of data at a remote site is typically used in the event of a failure at the primary site. Secondary copies of the current data contained in the primary site are typically made as the application system is writing new data to a primary site. In some data storage systems the secondary site may contain two or more peer computers operating together as a backup appliance to store the data in one or more storage devices. Each peer computer receives inbound data from the primary site and transfers the data to a storage controller, storage device(s), or other computers for backup storage of the data. This type of system could be used for a disaster recovery solution where a primary storage controller sends data to a backup appliance that, in turn, offloads the transfers to a secondary storage controller at a remote site. In such backup systems, data is typically maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage.

The backup appliance typically receives data transfers for specific volumes from a primary storage controller. The backup appliance maintains consistent transactions sets, wherein application of all the transactions to the secondary device creates a point-in-time consistency between the primary and secondary devices. For each consistent transactions set, there will be one data structure created that will contain information on all outbound transfers in the set. This structure will be maintained on both of the peer nodes of the backup appliance. The backup appliance will maintain consistent transactions sets while offloading the transactions sets to the secondary device asynchronously. Both peer nodes may transfer the data to any of the storage devices. To obtain the shortest transfer time it is necessary to divide the data transfers between the peers. An equal division of the data transfers between the two peers may not be optimal because the latency time to transfer data to a particular storage device may be different for each peer. This may result in one peer finishing before the other, and idle time for the other peer. A division of the data transfers between the two peers that results in both peers finishing simultaneously would reduce the total throughput latency for the system because both peers have to finish transferring the current consistent transactions set before beginning to transfer the subsequent one. There is a need to divide the data transfers between the peers to achieve an optimal minimum transfer time to transfer all of the data.

SUMMARY OF THE INVENTION

It is an object of the present invention to provide a method to optimize the overall latency of transferring data from peer computers to storage devices. Disclosed are a system, a method, and a computer program product to provide for the optimization of the output transfer load balance between two peer computers transferring data to one or more storage devices. The peer computers receive, organize and transfer the data to storage devices. The data set received may be a consistent transactions set or other type of data set for storage on one or more storage devices. The data set is composed of a plurality of data transfers. Each data transfer is an equal size block of data. The number of data transfers may vary for each data set received. Each of the peer computers receives all of the data transfers in the set, so that each peer has access to the entire set of data. The present invention operates by managing the assignments of data transfers for each peer computer and no data is transferred between the peers as the assignments change. The latency optimization occurs after a group of data is received and organized by the peer computers. The data transfers to storage devices are divided between two peer computers to balance the load between the peers and provide the minimum amount of time to transfer all of the data in the consistent transactions set to the storage devices. An important facet of the present invention is the use of the average amount of time it takes to transfer data blocks to each particular storage device from the peer computers. In the present invention each peer computer maintains continuously updated measurements of the average time it takes to transfer a block of data to each storage device. The transfer time measurements are used to optimize the output transfer load balance between the peers.

In addition the operation is autonomous and self-adjusting resulting in the peer nodes optimizing the assignments of the data transfers during the operation of the invention resulting in the minimization of idle time for either peer. The self-adjusting feature allows the system to react to changing conditions that affect data transfer rates to the storage devices.

Data sent to a backup appliance comprised of two peer computers is transferred to one or more storage devices using an optimization technique that divides the output transfer load between the peers using average latency information for each storage device. Data grouped in a consistent transactions set is first sorted into portions corresponding to the particular storage device where each data portion will be stored. The average latency time for the storage of a standard size block of data is compiled for each storage device for each of the peer computers. If the difference between the average latency for a storage device for the two peers is less than a specified relatively small latency threshold, then the storage device is assigned as an equal latency storage device and either peer may transfer data to the storage device. Excluding the equal latency storage devices, each peer is assigned to transfer data to the storage devices that have the smallest average latency for that particular peer. After assignment of the storage devices to the peer with the smallest latency, the equal latency storage devices are assigned to balance the total transfer load between the peers to enable both peers to finish transferring all of the data portions for the consistent transactions set at approximately the same time. Assigned storage devices may be reassigned to either peer to enable the equal latency storage devices to adequately balance the output transfer load between the peers. The storage devices are reassigned in a manner to minimize the total time to transfer all data in the consistent transaction data set.

The operation of the present invention is autonomic by continuously updating the average latency time for each storage device. The updated average latencies for each storage device are used each time a new consistent transactions set is transferred to the peer computers for storage. The updated average latency time is based upon a moving average with adjustable weighting of past and present measurements. This enables the present invention to adapt to changing conditions.

For a more complete understanding of the present invention, reference should be made to the following detailed description taken in conjunction with the accompanying drawings.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
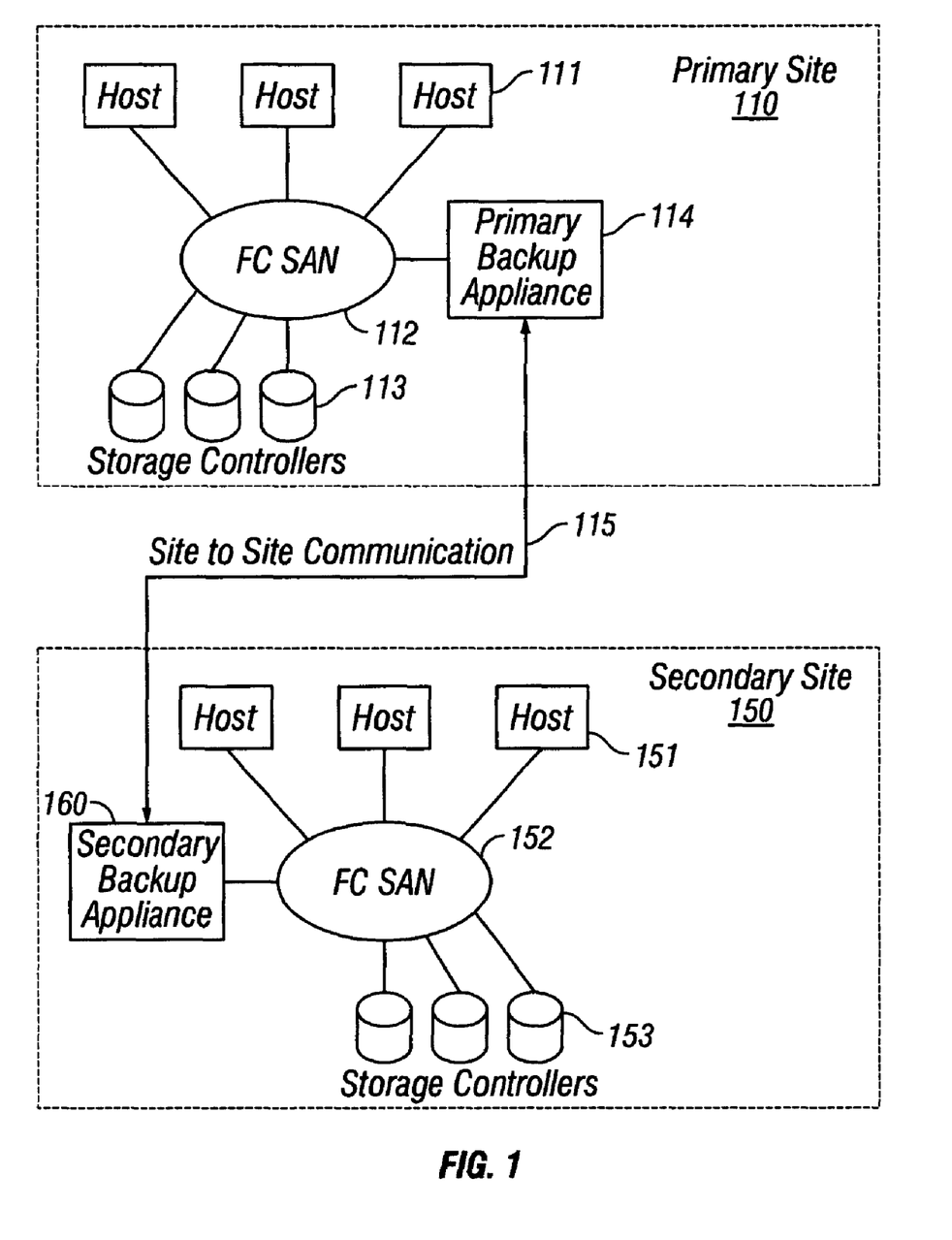
FIG. 1 is a block diagrammatic representation of a data storage network with primary and secondary sites.

Data storage systems may maintain more than one copy of data at secondary data storage sites to protect against losing the data in the event of a failure of any of the data storage components at the primary site. FIG. 1 shows a block diagram of a data storage system with a primary site 110 and secondary site 150. Primary site 110 and secondary site 150 are data storage sites that may be separated by a physical distance, or the sites may be located in close proximity to each other. Both the primary site 110 and secondary site 150 have one or more host computers 111, 151, a communication network within each site 112, 152, storage controllers 113, 153, and a communication network 115, between the sites. The host computers 111, 151, store and retrieve data with respect to the storage controllers 113, 153, using the site communication network 112, 152. The site communication network(s) 112, 152 may be implemented using a fiber channel storage area network (FC SAN). Data is transferred between the primary site 110 and secondary site 150 using communication network 115 through primary backup appliance 114 and secondary backup appliance 160. A secondary copy of the data from the primary site 110 is transferred to and maintained at the secondary site 150. In the event of a failure at the primary site 110 processing may be continued at secondary site 150. Because the physical distance may be relatively large between the primary site 110 and secondary site 150, the communication network 115 is typically slower than the communication network within each site 112, 152. Because of the relatively slow communication network 115 between the sites, consistent transactions sets are sent from primary site 110 to the secondary site 150 to ensure a point in time consistency between the sites. Consistent transactions sets are described in application entitled "Method, System and Article of Manufacture for Creating a Consistent Copy", application Ser. No. 10/339,957, filed on Jan. 9, 2003 of which is hereby incorporated by reference in its entirety. At the secondary site 150 the consistent transactions set is received and then transferred to various data storage devices for permanent storage.

Figure 2:
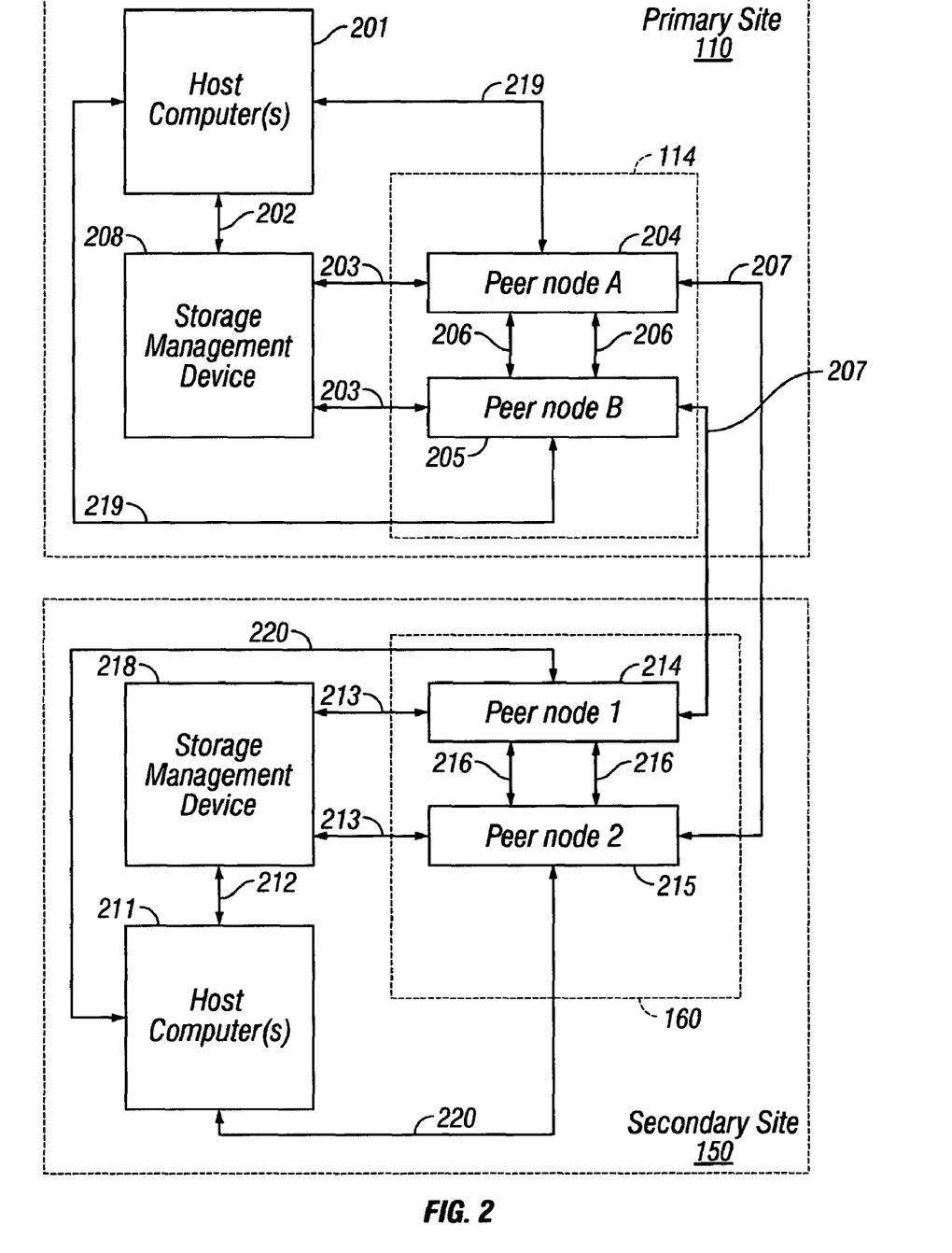
FIG. 2 is a block diagrammatic representation of a portion of the components located at the primary and secondary sites.

FIG. 2. is a block diagrammatic representation of a portion of the components of FIG. 1. At the primary site 110, host computer(s) 201 communicates with storage management device 208 using communication line(s) 202. The storage management device(s) 208 may comprise any storage management system known in the art, such as a storage controller, server, enterprise storage server, etc. Primary backup appliance 114 is comprised of peer node A 204, peer node B 205 and communication line(s) 206. Primary backup appliance 114 may have more or less components than shown in FIG. 2. Storage management device(s) 208 communicates with peer node A 204 and peer node B 205 using communication line(s) 203. Host computer(s) 201 may alternatively communicate directly with peer node A 204 and peer node B 205 using communication lines(s) 219. Herein references to peer node(s), peer computer(s), and peer(s) all refer to the same device(s). Peer node A 204 and peer node B 205 communicate with each other using communication line(s) 206. Communication lines 202, 203 and 206 may be implemented using any network or connection technology known in the art, such as a Local Area Network (LAN), Wide Area Network (WAN), Storage Area Network (SAN), the Internet, an Intranet, etc. Communication between any of the components may be in the form of executable instructions, requests for action, data transfers, status, etc.

At the secondary site 150 host computer(s) 211 communicates with storage management device 218 using communication line(s) 212. The storage management device(s) 218 may comprise any storage management system known in the art, such as a storage controller, server, enterprise storage server, etc. Secondary backup appliance 160 is comprised of peer node 1 214, peer node 2 215 and communication line(s) 216. Secondary backup appliance 160 may have more or less components than shown in FIG. 2. Storage management device(s) 218 communicates with peer node 1 214 and peer node 2 215 using communication lines 213. Host computer(s) 211 may alternatively communicate directly with peer node 1 214 and peer node 2 215 using communication line(s) 220. Peer node 1 214 and peer node 2 215 communicate with each other using communication lines 216. Communication lines 212, 213 and 216 may be implemented using any network or connection technology known in the art, such as a Local Area Network (LAN), Wide Area Network (WAN), Storage Area Network (SAN), the Internet, an Intranet, etc. The communication may be one or more paths between the components and not limited to the number of paths shown in FIG. 2. Communication between any of the components may be in the form of executable instructions, requests for action, data transfers, status, etc.

Primary site 110 and secondary site 150 communicate with each other using communication lines 207. Communication lines 207 may exist over a relatively large physical distance compared to communication lines 202, 203, 206, 212, 213 and 216. Because of the physical separation of the primary 110 and secondary 150 locations, the transfer rate or bandwidth of communication lines 207 may be relatively slow compared to communication lines 202, 203, 206, 212, 213 and 216. Communication lines 207 may be implemented using any connection technology known in the art such as the Internet, an Intranet, etc.

For the present invention, primary site host computer(s) 201 sends data for storage to storage management device 208 using communication line(s) 202. The storage management device 208 transfers this data to primary backup appliance 114 to create one or more backup copies of the data at a remote site. Alternatively, primary site host computer(s) 201 sends data directly to primary backup appliance 114 using communication line(s) 219 and then sends the same data to storage management device 208 using communication line(s) 202. Alternatively, primary site host computer(s) 201 sends data to storage management device 208 that passes through an intelligent switch that forwards a copy of the data to both primary backup appliance 114 and storage management device 208. The data is grouped into a consistent transactions set by peer node 1 204 and peer node 2 205 as it arrives from either storage management device 208 over communication lines 203, primary site host computer(s) 201, or an intelligent switch. Upon accumulating an entire consistent transaction data set, peer node A 204 and peer node B 205 transfer the consistent transactions set to peer node 1 214 and peer node 2 215 at the secondary site 150 using communication lines 207. Peer node 1 214 and peer node 2 215 transfer the entire consistent transactions set to storage management device 218 for storage using communication lines 213. Host computer(s) 211 may retrieve data from storage management device 218 using communication line(s) 212.

Figure 3A:
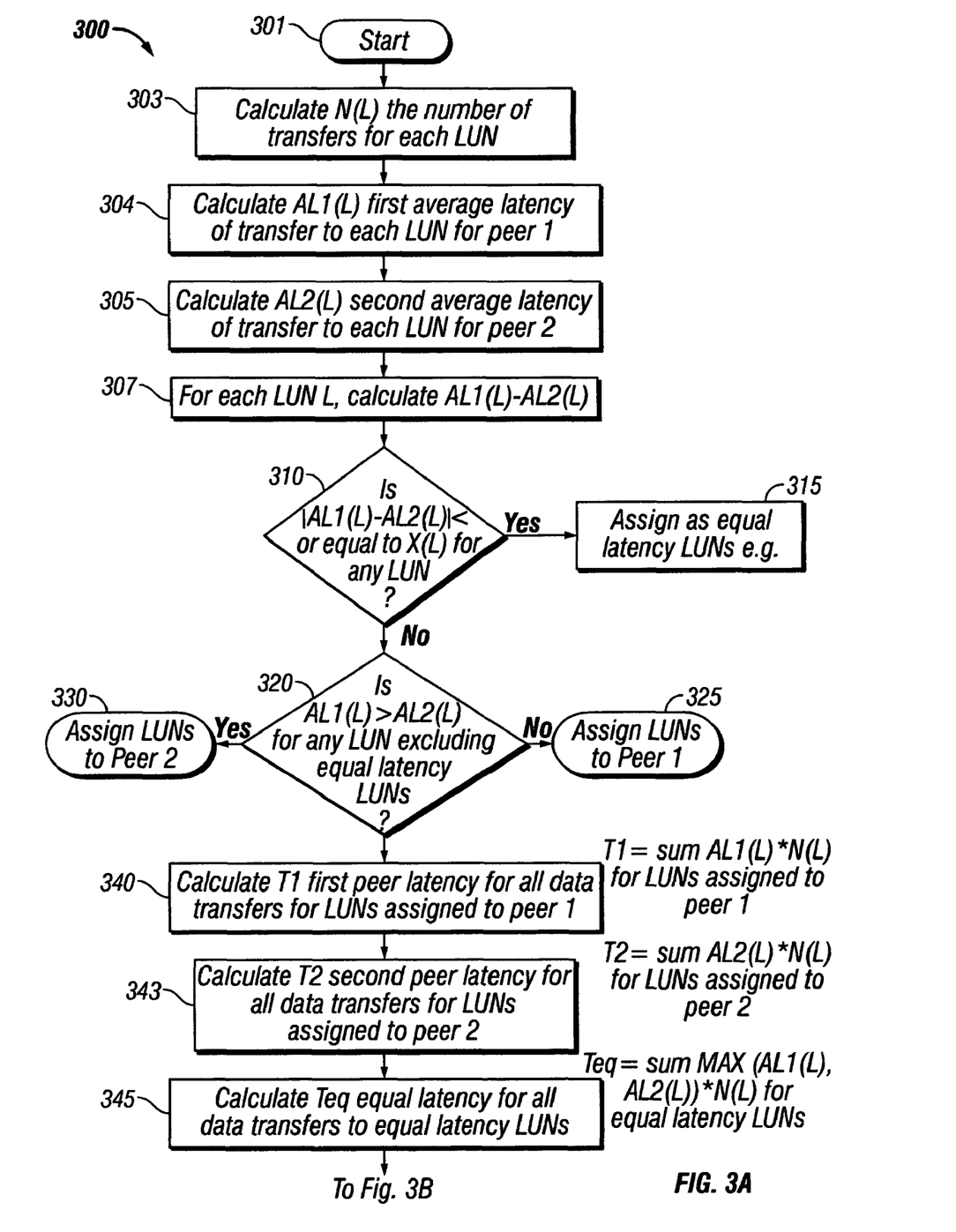
FIG. 3 is a flowchart of the method used to balance the outbound data transfers of two peer computers.
Figure 3B:
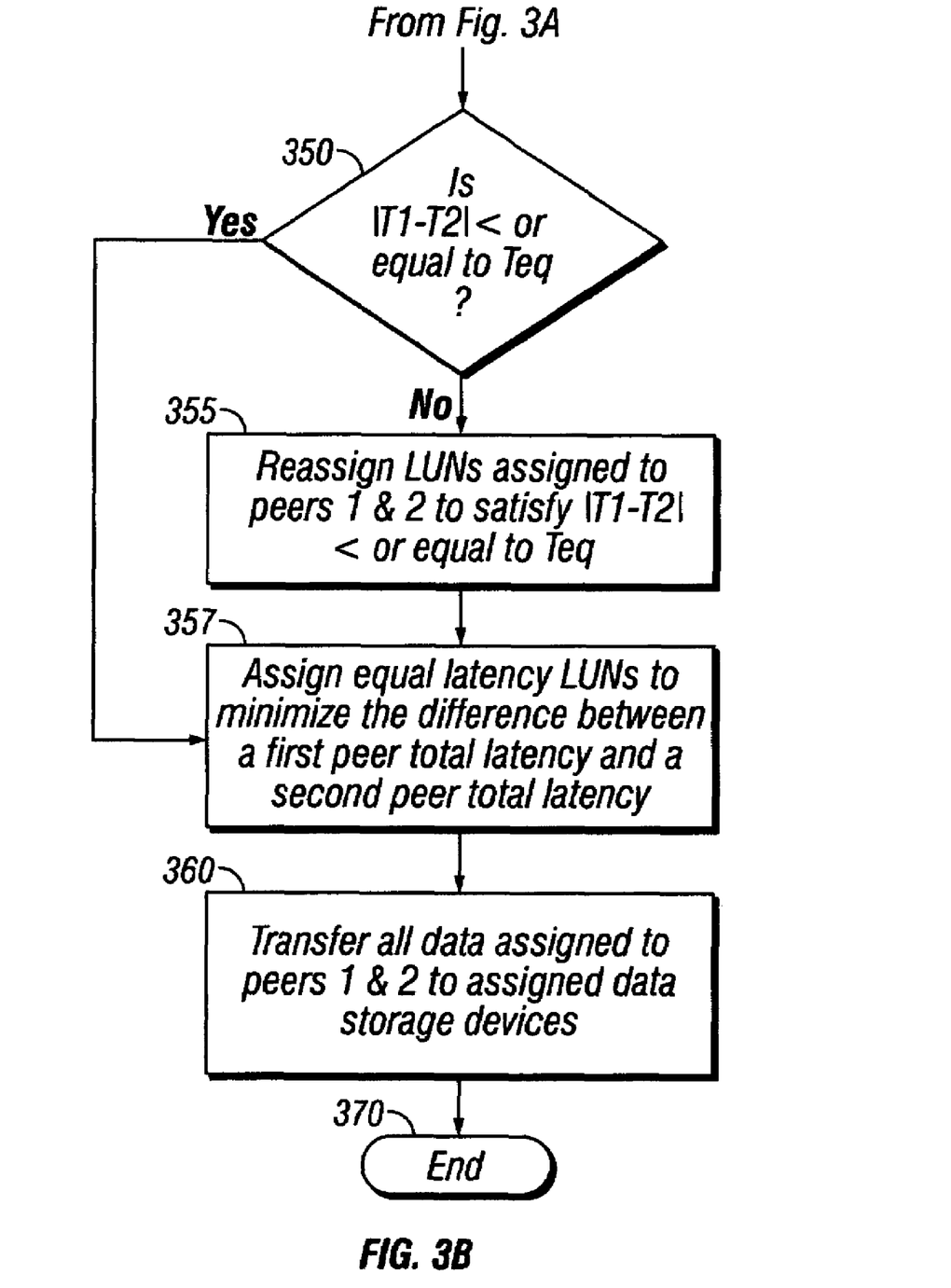

FIG. 3 contains flowchart 300 detailing the operation of the system to balance the output transfer load for peer node 1 214 and peer node 2 215. Storage management device(s) 218 each controls one or more storage devices. Each storage device used for the storage of data has an address specified as a Logical Unit Number (LUN). LUN is used as a shorthand notation in this description to identify a storage device or storage location for the storage of data; herein the terms LUN and storage device are used interchangeably. The present invention is not limited to the use of a LUN to identify a storage device or storage location and any terminology known in the art may be used. The index L is used in this description to number each storage device. The index, L, ranges from 1 to M, the total number of devices, M, used to store all of the data contained in a consistent transactions set. The present invention is not limited to the use of a LUN to identify a storage device or storage location or L to number the storage devices and any terminology known in the art may be used with out departing from the spirit of the invention. Furthermore, the present invention is not limited to the use of a LUN to carry out the processing of the invention and this processing could also be carried out using other logical groupings, including storage controllers, storage controller partitions, storage controller adapter cards, storage controller adapter card ports, etc.

Referring to FIG. 3, at step 303 peer node 1 214 and/or peer node 2 215 determine the number of data transfers, N(L), for each LUN, for the consistent transactions set to be stored. Each data transfer is an equal size block of data. The result of this determination is a 1 dimensional matrix of values with index L ranging from 1 to M, where M is the total number of LUNs needed to store all of the data in the present consistent transactions set. M may vary with each consistent transactions set to be stored. For example for the first LUN, L=1, N(1)=100 equal size blocks of data, second LUN, L=2, N(2)=1500 equal size blocks of data, continuing until N(M)=110 equal size blocks of data. The number of data transfers, N(L), and M will vary for each consistent transactions set. At step 304 first average latency, AL1(L), is calculated for all LUNs with index, L, ranging from 1 to M. First average latency, AL1(L), is the average latency to transfer a block of data from peer node 1 214 to the LUN identified by index L. At step 305 second average latency, AL2(L), is calculated for all LUNs with index, L, ranging from 1 to M. Second average latency, AL2(L), is the average latency to transfer a block of data from peer node 2 215 to the LUN identified by index L. First average latency, AL1(L), is calculated by applying an averaging algorithm to measurements of past data transfers from peer node 1 214 to the LUN identified by index L. Second average latency, AL2(L), is calculated by applying an averaging algorithm to measurements of past data transfers from peer node 2 215 to the LUN identified by index L. The averaging algorithm used to calculate first average latency, AL1(L), and second average latency, AL2(L), may be an equal weight average of past measurements of the appropriate latencies or more weight may be applied to the most recent latency measurements. The average latencies may be calculated by either peer node 1 214 or peer node 2 215 or both or may be calculated external to peer node 1 214 or peer node 2 215. The latency values used in the calculation of first average latency, AL1(L), and second average latency, AL2(L), are measured each time a data transfer occurs from one of the peer computers to a secondary storage controller. This latency measurement may occur at step 360 (described below) or the measurement may occur any time data is transferred to a storage device. The measurement is accomplished by measuring a first amount of elapsed time for transferring all data from peer node 1 214 to the LUNs assigned to peer node 1 214. This first amount of elapsed time is further decomposed into the elapsed time to transfer a block of data for each LUN resulting in a latency measurement for each LUN. For example, every time a data transfer is started, the peer node that is transferring the data determines the current time when the transfer begins. When the data transfer completes, the peer node determines the time the data transfer ended. The elapsed time is calculated by taking the difference between the two time values. The elapsed time is the latency for the data transfer. First average latency, AL1(L), is then recalculated by use of the decomposition of the measured first amount of elapsed time.

A second amount of elapsed time for transferring all data from peer node 2 215 to the LUNs assigned to peer node 2

215 is measured. This second amount of elapsed time is further decomposed into the elapsed time to transfer a block of data for each LUN. Second average latency, AL2(L), is then recalculated in the manner described above for first average latency, AL1(L).

Each peer node saves its latency values in its memory or associated memory. A variety of methods for calculating the average latency from the measured first and second amount of elapsed time for each peer may be used. A simple average of all the previous latency measurements taken for each LUN may be used.

A second method for calculating the average latency employs a moving average of the previous W latency measurements. The number W is chosen by an administrator, user or dynamically by the system. W may be modified at any time. The moving average will be calculated using only the most current W latency measurements. In this way only the most recent measurement data is used and older measurement data is discarded. This enables the invention to dynamically adapt to changing conditions.

In a third method a weighted average of the previous W latency measurements is used. In this method, a weight value is assigned to each of the W latency measurements. Each latency measurement is multiplied by its corresponding weight value and the average is taken over all of the products. The weights are chosen such that the oldest latency measurements have the smallest weights and the newest latency measurements have the greatest weights. The weighted average method can encompass the first two methods described above by a suitable choice of W and the weight value at each calculation interval. This provides a moving weighted average of the measured latencies that may be dynamically adjusted to provide an averaging technique of any of the three methods described above that may provide optimal operation of the present invention. Other averaging techniques may be used to further optimize the operation of the invention.

In the absence of latency measurement from either peer node 1 214 or peer node 2 215 to any LUN, estimates of the average latency may be calculated based on the available measurements of the latencies of any or all of the LUNs. Because there may not be any measurement data for a particular LUN, equal estimates of the latency for each peer could be used. The estimated latency may be derived from the use of the average of all the latencies for all the LUN measurements that are available, or the average of all the latencies for all the LUNs that are contained in the same storage controller as the unknown LUN. Either way, peer node 1 214 and peer node 2 215 must be assigned equal values for the LUN latencies in the absence of actual latency measurement data. When data is available for the LUN, the estimated values will be discarded and the actual values will be used.

At step 307 an average latency difference is calculated by subtracting second average latency, AL2(L), from first average latency, AL1(L), for all LUNs with index, L, ranging from 1 to M. At step 310 the absolute value of the average latency difference is compared to a latency threshold X. Latency threshold X is chosen as a small number that can be modified, if necessary, to tune the algorithms performance. X may be calculated using a specified percentage, Y, of the average latency difference that is considered to be small enough that the latency to transfer data to the selected LUN from either peer computer is approximately the same. A typical value of 5% for Y would be appropriate in most cases; however, values greater or less than 5% could be used to further optimize the operation of the present invention. The following equation could be used to calculate latency threshold X, $$X = \frac{Y}{100} \sum_{L=1}^{M} \frac{AL1(L) + AL2(L)}{2}.$$

Alternatively latency threshold, X, may be chosen to be different for each LUN, this provides an advantage because a fixed percentage of the latency difference is used to determine the equal latency LUNs. The resulting latency threshold, X increases if first average latency, AL1(L), and second average latency, AL2(L), increase. This may be advantageous when there is a large variation in first average latency, AL1(L), and second average latency, AL2(L). The following equation could be used to calculate latency threshold X(L), $$X(L)=(Y/100)*(AL1(L)+AL2(L))/2,$$

for index, L, ranging from 1 to M., from specified percentage, Y.

At step 315 those LUNs that have absolute values of the average latency difference less than latency threshold X (L) for index, L, ranging from 1 to M are assigned as equal latency LUNs. Latency threshold X(L), may or may not vary with index, L, as explained above. The LUNs that are not assigned as equal latency LUNs are divided into two categories at step 320. At step 320 second average latency, AL2(L), is compared to first average latency, to determine which of the two peers has the shortest latency for all LUNs excluding the equal latency LUNs. At step 325, the LUNs with a second average latency, AL2(L), that is greater than the sum of first average latency, AL1(L), and latency threshold X(L), are assigned to peer node 1 214, for all LUNs excluding the equal latency LUNs. The following equation may be applied at step 325, AL2(L)>X(L)+AL1(L), or all LUNs with second average latency, AL2(L), that is greater than first average latency, AL1(L) excluding the equal latency LUNs may be used to assign the LUNs to peer node 1 214. As explained above latency threshold X(L), may or may not vary with index, L.

At step 330, the LUNs with a first average latency, AL1(L), that is greater than the sum of second average latency, AL2(L), and latency threshold X(L), are assigned to peer node 2 215, for all LUNs excluding the equal latency LUNs. The following equation may be applied at step 325, AL1(L)>X(L)+AL2(L) or all LUNs with first average latency, AL1(L) that is greater than second average latency, AL2(L), excluding the equal latency LUNs may be used to assign the LUNs to peer node 2 215. At the conclusion of step 320, all of the LUNs for the present consistent transactions set are assigned as equal latency LUNs, assigned to peer node 1 214, or assigned to peer node 2 215.

At step 340 first peer latency, T1, is calculated by addition of all latencies for all of the LUNs assigned to peer node 1 214, using the number of transfers N(L), for each LUN for the present consistent transactions set. The following equation could be used to calculate first peer latency:

$$T1 = \sum_{L=1}^{M} AL1(L)*N(L),$$

for index, L, of all of the LUNs assigned to peer node 1 214. This calculation performs a summation for only the index values L, for LUNs that are assigned to peer node 1 214.

At step 343 second peer latency, T2, is calculated by addition of all latencies for all of the LUNs assigned to peer node 2 215, using the number of transfers N (L), for each LUN for the present consistent transactions set. The following equation could be used to calculate second peer latency:

$$T2 = \sum_{L=1}^{M} AL2(L) * N(L),$$

for index, L, of all of the LUNs assigned to peer node 2 215. This calculation performs a summation for only the index values L, for LUNs that are assigned to peer node 2 215.

At step 345 equal latency, Teq, is calculated by addition of all latencies for all of the LUNs assigned as equal latency LUNs, using the number of transfers N(L), for each LUN for the present consistent transactions set. The following equation could be used to calculate equal latency:

$$Teq = \sum_{L=1}^{M} \text{Max}(AL2(L), AL1(L)) * N(L),$$

for index, L, of all of the LUNs assigned as equal latency LUNs. The function Max(AL2(L), AL1(L)) selects the maximum value of either AL2(L) or AL1(L) and uses that maximum value for the calculation. This calculation performs a summation for only the index values L, for LUNs that are assigned as equal latency LUNs. Alternatively, the invention could use a minimum function, Min(AL2(L),AL1(L)), in this calculation.

At step 350, latency difference, Td, is calculated by subtracting second peer latency, T2, from first peer latency, T1, using the following equation:

$$Td = T2 - T1.$$

If the absolute value of latency difference, Td, is less than or equal to equal latency, Teq, then step 357 is executed. If the absolute value of latency difference, Td, is greater than equal latency, Teq, then step 355 is executed. At step 355, the LUNs that were assigned to peer node 1 214, and to peer node 2 215 at steps 325 and 330 are reassigned to peer node 1 214, and to peer node 2 215, so that the absolute value of the latency difference, Td, when recalculated with the reassignment is less than or equal to the equal latency, Teq. This reassignment of LUNs enables the use of equal latency LUNs to balance the output transfer load between the two peers. One implementation of Step 355 is further explained below after a description of step 357.

At step 357, the equal latency LUNs are assigned to peer node 1 214, and to peer node 2 215 to minimize the latency difference, Td, between peers. The minimization of the latency difference, Td, has the practical effect of balancing the output transfer load between the two peers. It may not be possible to exactly balance the loads because of the finite nature of the transfers that are being reassigned, or other conditions, therefore, a minimization of the latency difference, Td, is sufficient to balance the output transfer loads between the two peers. If step 357 is executed as a result of first executing step 355 then step 357 can be accomplished by reassignment of all equal latency LUNs to the peer with the smaller latency. This is because after first executing step 355 the latency difference, Td, between peers is approximately equal to Teq.

Figure 4:
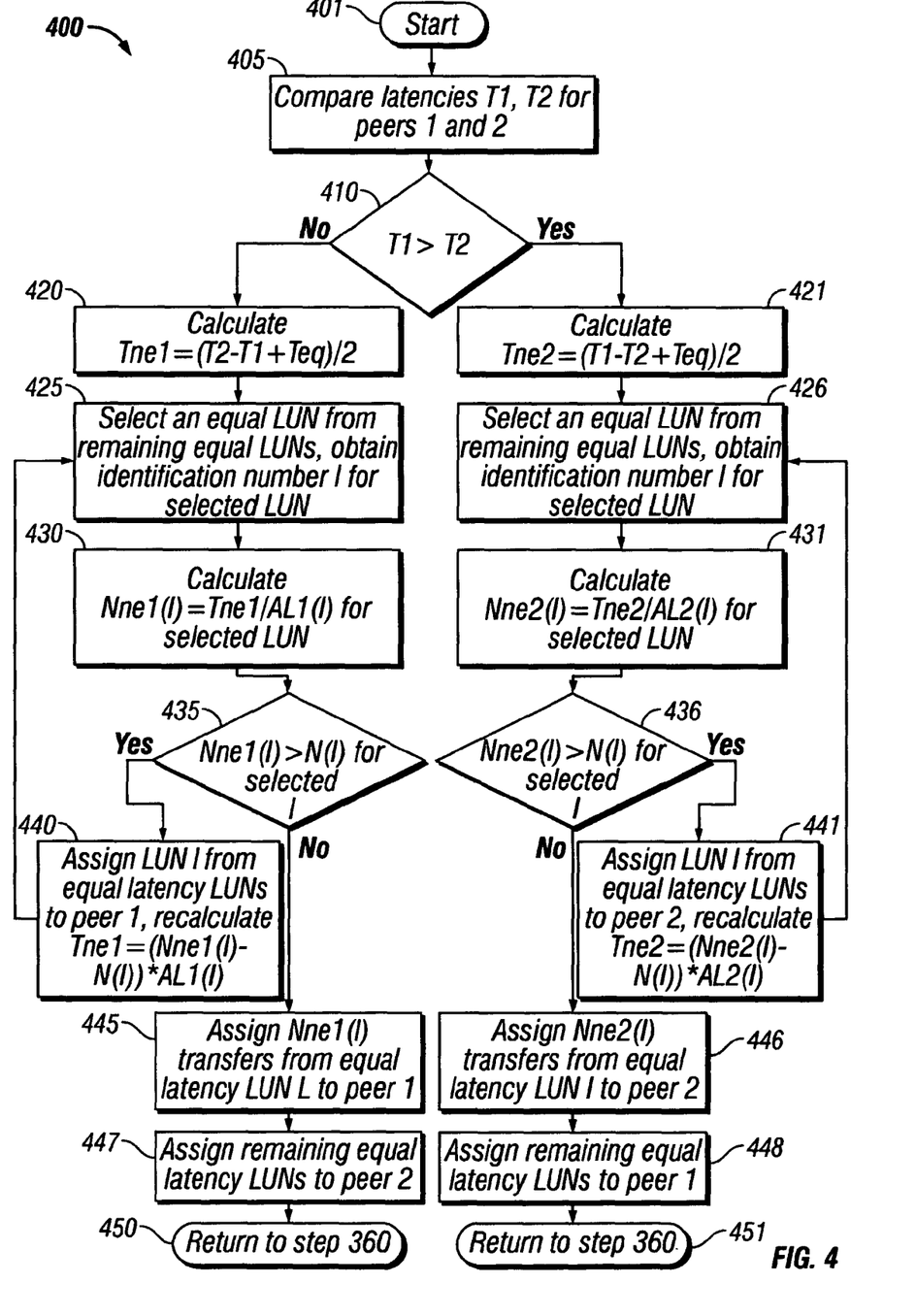
FIG. 4 is a flowchart of the method used in the present invention to assign equal latency data storage devices to balance the outbound data transfers.

One implementation of step 357 is further detailed in flowchart 400 shown in FIG. 4. This implementation may be used in either the case of step 357 being executed as a result of first executing step 355 or if step 357 is executed directly after step 350. Step 357 is composed of a series of operations beginning at step 401 and ending at either step 450 or step 451. At step 405, first peer latency, T1, and second peer latency, T2, are compared to determine the largest latency. At step 410, a decision is made to determine which step to execute next. If second peer latency, T2, is greater than or equal to first peer latency, T1, then step 420 is executed. If first peer latency, T1, is greater than second peer latency, T2, then step 421 is executed. The process starting with step 420 is described first followed by a description of the process starting at step 421.

At step 420, first equal latency, Tne1, is calculated using, $$Tne1 = (T2 - T1 + Teq)/2.$$

First equal latency, Tne1, is the total latency that must be moved from the equal latency LUNs to peer node 1 214, so that the equal latency LUNs will balance the output transfer load between the two peers.

At step 425, one of the LUNs assigned as equal latency LUNs is selected from the available equal latency LUNs and an identification number, I, is obtained for the equal latency LUN selected. In the preferred embodiment, at each execution of step 425, the LUN chosen should be the LUN with the largest first average latency, AL1(L), however this is not a requirement for the operation of the present invention. At step 430, first equal transfers, Nne1(I), is calculated using, Nne1=Tne1/AL1(I), for the equal latency LUN selected and identified by identification number, I. First equal transfers, Nne1(I), is the number of data transfers that need to be reassigned from the selected equal latency LUN to peer node 1 214.

At step 435, first equal transfers, Nne1(I), is compared to the number of transfers, N(I), for the selected LUN identified by identification number I. If the number of first equal transfers, Nne1(I), is more than the number of transfers, N(I), available for the LUN identified by identification number I, then step 440 is executed. At step 440 the selected LUN identified by identification number, I, is reassigned to peer node 1 214, first equal latency, Tne1, is recalculated using, Tne1=(Nne1(I)−N(I))*Al1(I) and step 425 is executed again using the recalculated first equal latency, Tne1. First equal latency, Tne1, is recalculated to remove the latency that was reassigned from the equal latency LUNs to peer node 1 214 and other equivalent calculations for the equation given above may be used. At step 425, an equal latency LUN is selected from the remaining equal latency LUNs in the same manner as previously described for step 425. As an example, the first time step 425 is executed after the execution of step 440, the LUN that was reassigned, to peer node 1 214, is removed from the available equal latency LUNs. Step 430 is executed after step 425 using the next equal latency LUN selected with the next identification number, I. Identification number, I changes each time step 425 is executed after executing step 430. Steps 435, 440, 425, and 430 are repeated until first equal transfers, Nne1(I), is less than or equal to the number of transfers, N(I), available for the LUN identified by identification number I.

If at step 435, first equal transfers, Nne1(I), is less than or equal to the number of transfers, N(I), for the selected LUN identified by identification number I, then first equal transfers, Nne1(I), for the selected LUN identified by identification number I, are assigned to peer node 1 214 at step 445. The remaining transfers, (N(I)−Nne(I)) remain assigned to the equal latency LUN identified by identification number I.

At step 447, all remaining equal latency LUNs not already assigned to peer node 1 214, and the remaining transfers N(I)−Nne(I) (if any are available) are assigned to peer node 2 215. After execution of step 447 control flows to step 450 where the process ends and returns to execute step 360.

If at step 410, first peer latency, T1, is greater than second peer latency, T2, then step 421 is executed. At step 421, second equal latency, Tne2, is calculated using, Tne2=(T1−T2+Teq)/2. Second equal latency, Tne2, is the total latency that must be moved from the equal latency LUNs to peer node 2 215, so that the equal latency LUNs will balance the output transfer load between the two peers.

At step 426, one of the LUNs assigned as equal latency LUNs is selected from the available equal latency LUNs and an identification number, I, is obtained for the equal latency LUN selected. In the preferred embodiment, at each execution of step 426, the LUN chosen should be the LUN with the largest AL2(I), however this is not a requirement for the operation of the present invention. At step 431, second equal transfers, Nne2(I), is calculated using, Nne2=Tne2/AL2(I), for the equal latency LUN selected and identified by identification number, I. Second equal transfers, Nne2(I), is the number of data transfers that need to be reassigned from the selected equal latency LUN to peer node 2 215.

At step 436, second equal transfers, Nne2(I), is compared to the number of transfers, N(I), for the selected LUN identified by identification number I. If the number of second equal transfers, Nne2(I), is more than the number of transfers, N(I), available for the LUN identified by identification number I, then step 441 is executed. At step 441 the selected LUN identified by identification number, I, is reassigned to peer node 2 215, second equal latency, Tne2, is recalculated using, Tne2=(Nne2(I)−N(I))*Al2(I) and step 426 is executed again using the recalculated, second equal latency, Tne2. Second equal latency, Tne2, is recalculated to remove the latency that was reassigned from the equal latency LUNs to peer node 2 215 and other equivalent calculations for the equation given above may be used. At step 426, an equal latency LUN is selected from the remaining equal latency LUNs. As an example, the first time step 426 is executed after the execution of step 441, the LUN that was reassigned, to peer node 2 215, is removed from the available equal latency LUNs. Step 431 is executed after step 426 using the next equal latency LUN selected with the next identification number, I. Identification number, I changes each time step 426 is executed after executing step 431. Steps 436, 441, 426, and 431 are repeated until second equal transfers, Nne2(I), is less than or equal to the number of transfers, N(I), for the selected LUN identified by identification number I. Identification number, I changes each time step 426 is executed after executing step 431.

If at step 436, second equal transfers, Nne2(I), is less than or equal to the number of transfers, N(I), for the selected LUN identified by identification number I, then second equal transfers, Nne2(I), for the selected LUN identified by identification number I, are assigned to peer node 2 215 at step 446. The remaining transfers (N(I)−Nne2(I)) remain assigned to the equal latency LUN identified by identification number I.

At step 448, all remaining equal latency LUNs not already assigned to peer node 2 215, and the remaining transfers (N(I)−Nne2(I)) are assigned to peer node 1 214. After execution of step 448 control flows to step 451 where the process ends and returns to execute step 360. At step 360 all of the data for the present consistent transactions set is transferred to the LUNs assigned to peer node 1 214, and to peer node 2 215. Both peers will finish transferring data at approximately the same time because of the load balancing of the present invention.

Figure 5:
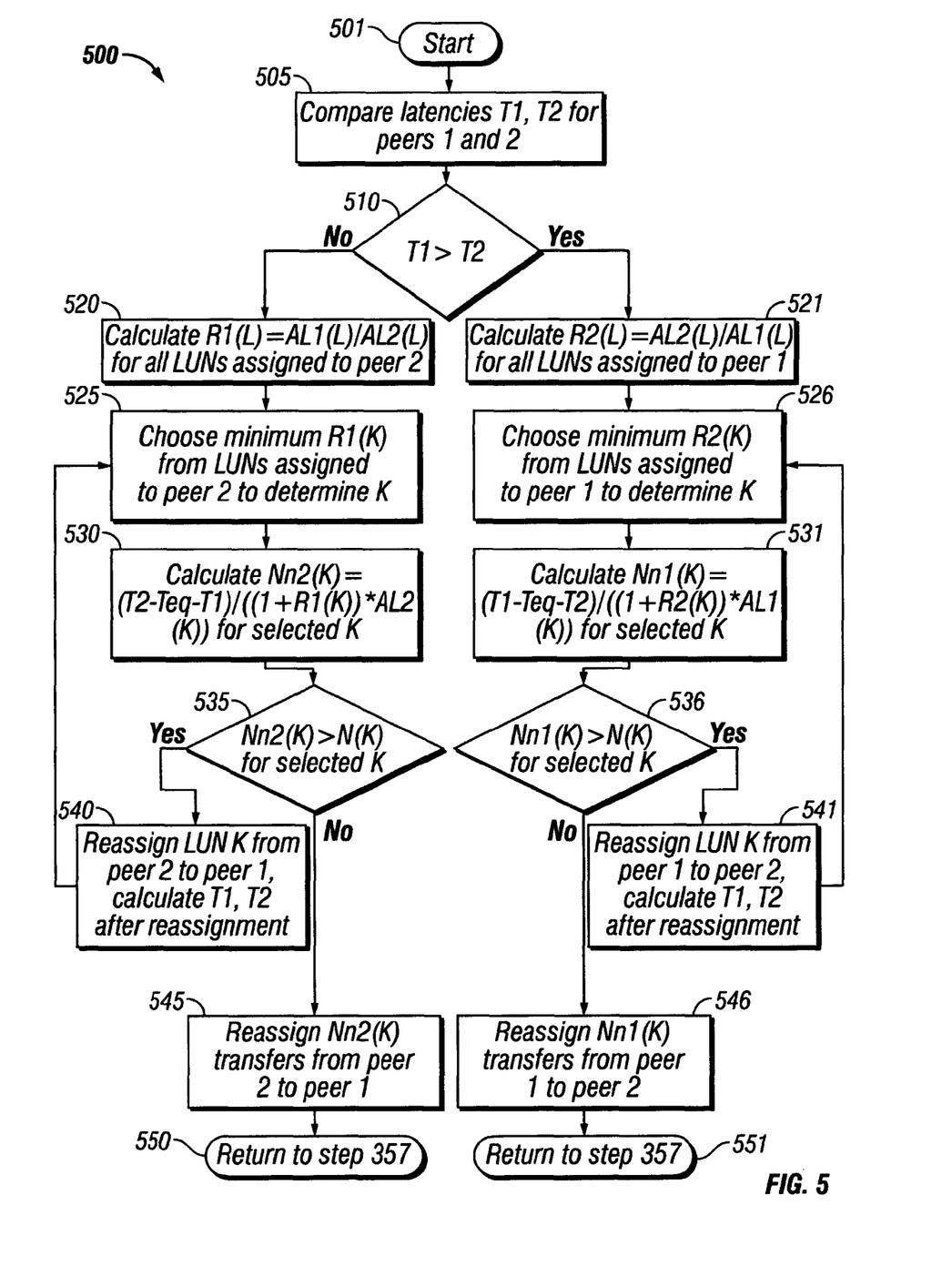
FIG. 5 is a flowchart of the method used to reassign data storage devices to permit the equal latency data storage devices to balance the outbound data transfers.

One implementation of step 355, is now described. Step 355, is executed if the LUNs that were assigned to peer node 1 214, and to peer node 2 215 at steps 325 and 330 need to be reassigned to peer node 1 214, and to peer node 2 215, so that the equal latency LUNs will balance the output transfer load between the two peers. FIG. 5 shows a flowchart 500 of one implementation of step 355, starting at step 501. At step 505, first peer latency, T1, and second peer latency, T2, are compared to determine the peer with the largest total latency. At step 510, a decision is made to determine which step to execute next. If second peer latency, T2, is greater than first peer latency, T1, then step 520 is executed. If first peer latency, T1, is greater than second peer latency, T2, then step 521 is executed. The case of first peer latency, T1, being equal to second peer latency, T2, is not encountered for this process because that would be determined at step 350, with the result of step 355 not being executed. The process starting with step 520 is described first, followed by a description of the process starting at step 521.

At step 520, first latency ratio, R1(L), is calculated using, R1(L)=(AL1(L)/AL2(L), for index, L, for all of the LUNs assigned to peer node 2 215. This calculation determines first latency ratio, R1(L), for only the index values L, for LUNs that are assigned to peer node 2 215. At step 525, the LUN that is assigned to peer node 2 215, with the smallest value of first latency ratio, R1(L), is selected and an identification number, K, is obtained for LUN selected.

At step 530, the number of second peer transfers, Nn2(K), is calculated using, Nn2(K)=(T2−Teq−T1)/((1+R1(K))*AL2(K)), for the LUN selected and identified by identification number, K. The number of second peer transfers, Nn2(K), is the number of data transfers from the selected LUN (identified by identification number, K, and assigned to peer node 2 215) that need to be reassigned from peer node 2 215 to peer node 1 214, so that the equal latency LUNs will balance the load between the peers.

At step 535, the number of second peer transfers, Nn2(K), is compared to the number of transfers, N(K), for the selected LUN identified by identification number K. If the number of second peer transfers, Nn2(K), is more than the number of transfers, N(K), available for the LUN identified by identification number K, then step 540 is executed. At step 540 the selected LUN identified by identification number, K, is reassigned to peer node 1 214. First peer latency, T1, is recalculated by addition of all latencies for all of the LUNs assigned to peer node 1 214 (including the selected LUN identified by identification number, K, that was reassigned to peer node 1 214), using the number of transfers N(L), for each LUN for the present consistent transactions set. The following equation could be used to recalculate first peer latency, $$T1 = \sum_{L=1}^{M} AL1(L) * N(L),$$

for index, L, of all of the LUNs assigned to peer node 1 214. This calculation performs a summation for only the index values L, for LUNs that are assigned to peer node 1 214. Alternatively, the first peer latency could be recalculated by adding the reassigned LUN transfer latency, N(K)*AL1(K), to the previous first peer latency. Second peer latency, T2, is recalculated by addition of all latencies for all of the LUNs assigned to peer node 2 215, using the number of transfers N(L), for each LUN (the selected LUN identified by identification number, K, that was reassigned to peer node 1 214 is removed), for the present consistent transactions set. The following equation could be used to recalculate second peer latency, $$T2 = \sum_{L=1}^{M} AL2(L) * N(L),$$

for index, L, of all of the LUNs assigned to peer node 2 215. This calculation performs a summation for only the index values L, for LUNs that are assigned to peer node 2 215. Alternatively, the second peer latency could be recalculated by subtracting the reassigned LUN transfer latency, N(K)*AL2(K), from the previous second peer latency. After the recalculation of first peer latency, T1, and second peer latency, T2, step 525, is executed again. At step 525, the LUN that is assigned to peer node 2 215, (the selected LUN identified by identification number, K, that was reassigned to peer node 1 214 is removed) with the smallest value of first latency ratio, R1(L), is selected and the next identification number, K, is obtained for the LUN selected. Step 530 is executed after step 525 using the next LUN selected with the next identification number, K. Identification number, K changes each time step 525 is executed after executing step 530. Steps 535, 540, 525, and 530 are repeated until the number of second peer transfers, Nn2(K), is less than or equal to the number of transfers, N(K), available for the LUN identified by identification number K.

If at step 535, the number of second peer transfers, Nn2(K), is less than or equal to the number of transfers, N(K), available for the LUN identified by identification number K, then the number of second peer transfers, Nn2(K), for the selected LUN identified by identification number K, are reassigned from peer node 2 215 to peer node 1 214 at step 545. The remaining transfers N(K)−Nn2(K) remain assigned to peer node 2 215. At step 550 the process ends and returns to execute step 357.

If at step 510, first peer latency, T1, is greater than second peer latency, T2, then step 521 is executed. At step 521, second latency ratio, R2(L), is calculated using, R2(L)= (AL2(L)/AL1(L), for index, L, for all of the LUNs assigned to peer node 1 214. This calculation determines second latency ratio, R2(L), for only the index values L, for LUNs that are assigned to peer node 1 214. At step 526, the LUN that is assigned to peer node 1 214, with the smallest value of second latency ratio, R2(L), is selected and an identification number, K, is obtained for LUN selected.

At step 531, the number of first peer transfers, Nn1(K), is calculated using, Nn1(K)=(T1−Teq−T2)/((1+R2(K))*AL1(K)), for the LUN selected and identified by identification number, K. The number of first peer transfers, Nn1(K), is the number of data transfers from the selected LUN (identified by identification number, K, and assigned to peer node 1 214) that need to be reassigned from peer node 1 214 to peer node 2 215, so that the equal latency LUNs will balance the load between the peers.

At step 536, the number of first peer transfers, Nn1(K), is compared to the number of transfers, N(K), for the selected LUN identified by identification number K. If the number of first peer transfers, Nn1(K), is more than the number of transfers, N(K), available for the LUN identified by identification number K, then step 541 is executed. At step 541 the selected LUN identified by identification number, K, is reassigned to peer node 2 215. First peer latency, T1, is recalculated by addition of all latencies for all of the LUNs assigned to peer node 1 214 (the selected LUN identified by identification number, K, that was reassigned to peer node 2 215 is removed), using the number of transfers N(L), for each LUN for the present consistent transactions set. The following equation could be used to recalculate first peer latency, $$T1 = \sum_{L=1}^{M} AL1(L) * N(L),$$

for index, L, of all of the LUNs assigned to peer node 1 214. This calculation performs a summation for only the index values L, for LUNs that are assigned to peer node 1 214. Alternatively, the first peer latency could be recalculated by subtracting the reassigned LUN transfer latency, N(K)*AL1(K), from the previous first peer latency. Second peer latency, T2, is recalculated by addition of all latencies for all of the LUNs assigned to peer node 2 215, (including the selected LUN identified by identification number, K, that was reassigned to peer node 2 215), using the number of transfers N(L), for each LUN for the present consistent transactions set. The following equation could be used to recalculate second peer latency, $$T2 = \sum_{L=1}^{M} AL2(L) * N(L),$$

for index, L, of all of the LUNs assigned to peer node 2 215. This calculation performs a summation for only the index values L, for LUNs that are assigned to peer node 2 215. Alternatively, the second peer latency could be recalculated by adding the reassigned LUN transfer latency, N(K)*AL2(K), to the previous second peer latency. After the recalculation of first peer latency, T1, and second peer latency, T2, step 526, is executed again. At step 526, the LUN that is assigned to peer node 1 214, (the selected LUN identified by identification number, K, that was reassigned to peer node 2 215 is removed) with the smallest value of second latency ratio, R2(L), is selected and the next identification number, K, is obtained for the LUN selected. Step 531 is executed after step 526 using the next LUN selected with the next identification number, K. Identification number, K changes each time step 526 is executed after executing step 531. The steps 536, 541, 526, and 531 are repeated until the number of first peer transfers, Nn1(K), is less than or equal to the number of transfers, N(K), available for the LUN identified by identification number K.

If at step 536, the number of first peer transfers, Nn1(K), is less than or equal to the number of transfers, N(K), available for the LUN identified by identification number K, then the number of first peer transfers, Nn1(K), for the selected LUN identified by identification number K, are reassigned from peer node 2 215 to peer node 1 214 at step 546. The remaining transfers N(K)–Nn1(K) remain assigned to peer node 2 215. At step 551 the process ends and returns to execute step 357.

For the present invention, the description and the claims that follow, variables, matrices, and indexes are assigned names and letters to facilitate an understanding of the invention. The variables, matrices, indexes, assigned names, and letters are chosen arbitrarily and are not intended to limit the invention.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A method for a first peer and a second peer to maintain an optimized balance of a plurality of data transfers to one or more storage devices, where said method comprises the steps of:
    (303) calculating a number of transfers, N(L), for each of said one or more storage devices;
    (304) calculating a first average latency, AL1(L), for each of said one or more storage devices for said first peer;
    (305) calculating a second average latency, AL2(L), for each of said one or more storage devices for said second peer;
    (307) calculating an absolute value of the difference of said first average latency and said second average latency for each of said one or more storage devices;
    (315) assigning as equal latency storage devices those of said one or more storage devices that have said absolute value less than or equal to a latency threshold;
    (325) assigning those of said one or more storage devices to said first peer that have said second average latency more than the sum of said first average latency and said latency threshold;
    (330) assigning those of said one or more storage devices to said second peer that have said first average latency more than the sum of said second average latency and said latency threshold;
    (340) calculating a first peer latency, T1, for said those of said one or more storage devices assigned to said first peer;
    (343) calculating a second peer latency, T2, for said those of said one or more storage devices assigned to said second peer;
    (345) calculating a equal latency, Teq, for said those of said one or more storage devices assigned as equal latency storage devices;
    (350) calculating a latency difference, Td, between said first peer latency, T1, and said second peer latency, T2, and calculating an absolute value of said latency difference, Td;
    (355) in response to said absolute value of said latency difference being greater than said equal latency, Teq, reassigning said those of said one or more storage devices assigned to said first peer and said those of said one or more storage devices assigned to said second peer to said first peer and said second peer so that said absolute value of said latency difference when recalculated with said reassignment of said those of said one or more storage devices assigned to said first peer and said those of said one or more storage devices assigned to said second peer to said first peer and said second peer is less than or equal to said equal latency, Teq;
    (357) reassigning said those of said one or more storage devices assigned as equal latency storage devices to said first peer and said second peer to minimize said absolute value of said latency difference, Td; and
    (360) transferring all data from said first peer to said one or more storage devices assigned to said first peer and transferring all data from said second peer to said one or more storage devices assigned to said second peer.

2. The method of claim 1, wherein step 357 further comprises:
    in response to said second peer latency, T2, being greater than or equal to said first peer latency, T1 performing the following steps:
    (420) calculating a first equal latency, Tne1, where Tne1=(T2−T1+Teq)/2;
    (425) selecting one of said one or more storage devices assigned as equal latency storage devices and obtaining an identification number I for said selected storage device;
    (430) calculating a number of first equal transfers, Nne1(I), for said selected storage device identified by said identification number I, where Nne1(I)=Tne1/AL1(I);
    (440) in response to said number of first equal transfers Nne1(I) being more than said number of transfers N(I) for said selected storage device identified by said identification number I, reassign said selected storage device identified by said identification number, I, to said first peer, recalculate first equal latency, Tne1, to remove the latency of said selected storage device identified by said identification number, I, and return to step 425;
    (445) in response to said number of first equal transfers Nne1(I) being less than or equal to said number of transfers N(I) for said selected storage device identified by said identification number I, reassign said number of first equal transfers Nne1(I) to said selected storage device identified by said identification number, I, to said first peer; and
    (447) reassign to said second peer those of said one or more storage devices assigned as equal latency storage devices not assigned to said first peer.

3. The method of claim 2, wherein step 425 further comprises:
    selecting one of said one or more storage devices assigned as equal latency storage devices that has the largest first average latency, AL1 (I), and obtaining an identification number, I, for said selected storage device.

4. The method of claim 1, wherein step 357 further comprises:
    in response to said first peer latency, T1 being greater than said second peer latency, T2, performing the following steps:
    (421) calculating a second equal latency, Tne2, where Tne2=(T1−T2+Teq)/2;
    (426) selecting one of said one or more storage devices assigned as equal latency storage devices and obtaining an identification number, I, for said selected storage device;

(431) calculating a number of second equal transfers, Nne2(I), for said selected storage device identified by said identification number, I, where Nne2(I)=Tne2/AL2(I);

(441) in response to said number second equal transfers, Nne2(I), being more than said number of transfers, N(I), for said selected storage device identified by said identification number I, reassign said selected storage device identified by said identification number I to said second peer, recalculate Tne2, to remove the latency of said selected storage device identified by said identification number, I, and return to step 426;

(446) in response to said number of second equal transfers, Nne2(I), being less than or equal to said number of transfers, N(I), for said selected storage device identified by said identification number I, assign said number of second equal transfers, Nne2(I), of said selected storage device identified by said identification number, I, to said second peer; and (448) reassign to said first peer those of said one or more storage devices assigned as equal latency storage devices not assigned to said second peer.

5. The method of claim 4, wherein step 426 further comprises:

selecting one of said one or more storage devices assigned as equal latency storage devices that has the largest second average latency, AL2(I), and obtaining an identification number, I, for said selected storage device.

6. The method of claim 1 wherein step 355 further comprises:

in response to said second peer latency, T2, being greater than said first peer latency, T1, performing the following steps:

(520) calculating a first latency ratio, R1(L), for each of said one or more storage devices assigned to said second peer, where R1(L)=AL1(L)/AL2(L);

(525) selecting one of said one or more storage devices assigned to said second peer that has the smallest of said first latency ratio, R1(L), and obtaining an identification number, K, for said selected storage device;

(530) calculating a number of second peer transfers, Nn2(K), for said selected storage device identified by said identification number, K, where Nn2(K)=(T2−Teq−T1)/((1+R1(K))*AL2(K));

(540) in response to said number of second peer transfers, Nn2(K), being greater than said number of transfers, N(K), for said selected storage device identified by said identification number K, reassign said selected storage device identified by said identification number, K, to said first peer, recalculate said first peer latency, T1, for said those of said one or more storage devices assigned to said first peer, recalculate said second peer latency, T2, for said those of said one or more storage devices assigned to said second peer and return to step 525; and (545) in response to said number of second peer transfers, Nn2(K), being less than or equal to said number of transfers, N(K), for said selected storage device identified by said identification number K, reassign said number of second peer transfers, Nn2(K), of said selected storage device identified by said identification number, K, to said first peer.

7. The method of claim 1, wherein step 355 further comprises:

in response to said second peer latency, T2, being less than said first peer latency, T1, performing the following steps:

(521) calculating a second latency ratio, R2(L), for each of said one or more storage devices assigned to said first peer, where R2(L)=AL2(L)/AL1(L);

(526) selecting one of said one or more storage devices assigned to said first peer that has the smallest of said latency ratio, R2(L), and obtaining an identification number K for said selected storage device;

(531) calculating a number of first peer transfers, Nn1(K), for said selected storage device identified by said identification number, K, where Nn1(K)=(T1−Teq−T2)/((1+R2(K))*AL1(K));

(541) in response to said number of first peer transfers, Nn1(K), being greater than said number of transfers, N(K), for said selected storage device identified by said identification number K, reassign said selected storage device identified by said identification number, K, to said second peer, recalculate said first peer latency, T1, for said those of said one or more storage devices assigned to said first peer, recalculate said second peer latency, T2, for said those of said one or more storage devices assigned to said second peer and return to step 526; and (546) in response to said first peer transfer number, Nn1(K), being less than or equal to said number of transfers, N(K), for said selected storage device identified by said identification number K, reassign said number of first peer transfers Nn1(K) of said selected storage device identified by said identification number, K, to said second peer.

8. The method of claim 1 further comprising the additional steps of:

measuring a first amount of elapsed time for said transferring all data from said first peer to said one or more storage devices assigned to said first peer;

measuring a second amount of elapsed time for said transferring all data from said second peer to said one or more storage devices assigned to said second peer;

recalculating said first average latency, AL1(L), by use of said first amount of elapsed time with a moving weighted average calculation for each of said one or more storage devices assigned to said first peer; and recalculating said second average latency, AL2(L), by use of said second amount of elapsed time with said moving weighted average calculation for each of said one or more storage devices assigned to said second peer.

9. An article of manufacture comprising a data storage medium tangibly embodying a program of machine-readable instructions executable by a digital processing apparatus to perform method steps for a first peer and a second peer to maintain an optimized balance of a plurality of data transfers to one or more storage devices, said method steps comprising:

(303) calculating a number of transfers, N(L), for each of said one or more storage devices;

(304) calculating a first average latency, AL1(L), for each of said one or more storage devices for said first peer;

(305) calculating a second average latency, AL2(L), for each of said one or more storage devices for said second peer;

(307) calculating an absolute value of the difference of said first average latency and said second average latency for each of said one or more storage devices;

(315) assigning as equal latency storage devices those of said one or more storage devices that have said absolute value less than or equal to a latency threshold;

(325) assigning those of said one or more storage devices to said first peer that have said second average latency more than the sum of said first average latency and said latency threshold;

(330) assigning those of said one or more storage devices to said second peer that have said first average latency more than the sum of said second average latency and said latency threshold;

(340) calculating a first peer latency, T1, for said those of said one or more storage devices assigned to said first peer;

(343) calculating a second peer latency, T2, for said those of said one or more storage devices assigned to said second peer;

(345) calculating a equal latency, Teq, for said those of said one or more storage devices assigned as equal latency storage devices;

(350) calculating a latency difference, Td, between said first peer latency, T1, and said second peer latency, T2, and calculating an absolute value of said latency difference, Td;

(355) in response to said absolute value of said latency difference being greater than said equal latency, Teq, reassigning said those of said one or more storage devices assigned to said first peer and said those of said one or more storage devices assigned to said second peer to said first peer and said second peer so that said absolute value of said latency difference when recalculated with said reassignment of said those of said one or more storage devices assigned to said first peer and said those of said one or more storage devices assigned to said second peer to said first peer and said second peer is less than or equal to said equal latency, Teq;

(357) reassigning said those of said one or more storage devices assigned as equal latency storage devices to said first peer and said second peer to minimize said absolute value of said latency difference, Td; and (360) transferring all data from said first peer to said one or more storage devices assigned to said first peer and transferring all data from said second peer to said one or more storage devices assigned to said second peer.

10. The article of manufacture of claim 9, wherein step 357 further comprises:

in response to said second peer latency, T2, being greater than or equal to said first peer latency, T1 performing the following steps:

(420) calculating a first equal latency, Tne1, where Tne1=(T2−T1+Teq)/2;

(425) selecting one of said one or more storage devices assigned as equal latency storage devices and obtaining an identification number I for said selected storage device;

(430) calculating a number of first equal transfers, Nne1(I), for said selected storage device identified by said identification number I, where Nne1(I)=Tne1/AL1(I);

(440) in response to said number of first equal transfers Nne1(I) being more than said number of transfers N(I) for said selected storage device identified by said identification number I, reassign said selected storage device identified by said identification number, I, to said first peer, recalculate first equal latency, Tne1, to remove the latency of said selected storage device identified by said identification number, I, and return to step 425;

(445) in response to said number of first equal transfers Nne1(I) being less than or equal to said number of transfers N(I) for said selected storage device identified by said identification number I, reassign said number of first equal transfers Nne1(I) to said selected storage device identified by said identification number, I, to said first peer; and (447) reassign to said second peer those of said one or more storage devices assigned as equal latency storage devices not assigned to said first peer.

11. The article of manufacture of claim 10, wherein step 425 further comprises:

selecting one of said one or more storage devices assigned as equal latency storage devices that has the largest first average latency, AL1(I), and obtaining an identification number, I, for said selected storage device.

12. The article of manufacture of claim 9, wherein step 357 further comprises:

in response to said first peer latency, T1 being greater than said second peer latency, T2, performing the following steps:

(421) calculating a second equal latency, Tne2, where Tne2=(T1−T2+Teq)/2;

(426) selecting one of said one or more storage devices assigned as equal latency storage devices and obtaining an identification number, I, for said selected storage device;

(431) calculating a number of second equal transfers, Nne2(I), for said selected storage device identified by said identification number, I, where Nne2(I)=Tne2/AL2(I);

(441) in response to said number second equal transfers, Nne2(I), being more than said number of transfers, N(I), for said selected storage device identified by said identification number I, reassign said selected storage device identified by said identification number I to said second peer, recalculate Tne2, to remove the latency of said selected storage device identified by said identification number, I, and return to step 426;

(446) in response to said number of second equal transfers, Nne2(I), being less than or equal to said number of transfers, N(I), for said selected storage device identified by said identification number I, assign said number of second equal transfers, Nne2(I), of said selected storage device identified by said identification number, I, to said second peer; and (448) reassign to said first peer those of said one or more storage devices assigned as equal latency storage devices not assigned to said second peer.

13. The article of manufacture of claim 12, wherein step 426 further comprises:

selecting one of said one or more storage devices assigned as equal latency storage devices that has the largest second average latency, AL2(I), and obtaining an identification number, I, for said selected storage device.

14. The article of manufacture of claim 9, wherein step 355 further comprises:

in response to said second peer latency, T2, being greater than said first peer latency, T1, performing the following steps:

(520) calculating a first latency ratio, R1(L), for each of said one or more storage devices assigned to said second peer, where R1(L)=AL1(L)/AL2(L);

(525) selecting one of said one or more storage devices assigned to said second peer that has the smallest of said first latency ratio, R1(L), and obtaining an identification number, K, for said selected storage device;

(530) calculating a number of second peer transfers, Nn2(K), for said selected storage device identified by said identification number, K, where Nn2(K)=(T2−Teq−T1)/((1+R1(K))*AL2(K));

(540) in response to said number of second peer transfers, Nn2(K), being greater than said number of transfers, N(K), for said selected storage device identified by said identification number K, reassign said selected storage device identified by said identification number, K, to said first peer, recalculate said first peer latency, T1, for said those of said one or more storage devices assigned to said first peer, recalculate said second peer latency, T2, for said those of said one or more storage devices assigned to said second peer and return to step 525; and (545) in response to said number of second peer transfers, Nn2(K), being less than or equal to said number of transfers, N(K), for said selected storage device identified by said identification number K, reassign said number of second peer transfers, Nn2(K), of said selected storage device identified by said identification number, K, to said first peer.

15. The article of manufacture of claim 9, wherein step 355 further comprises:
in response to said second peer latency, T2, being less than said first peer latency, T1, performing the following steps:
(521) calculating a second latency ratio, R2(L), for each of said one or more storage devices assigned to said first peer, where R2(L)=AL2(L)/AL1(L);
(526) selecting one of said one or more storage devices assigned to said first peer that has the smallest of said latency ratio, R2(L), and obtaining an identification number K for said selected storage device;
(531) calculating a number of first peer transfers, Nn1(K), for said selected storage device identified by said identification number, K, where Nn1(K)=(T1−Teq−T2)/((1+R2(K))*AL1(K));
(541) in response to said number of first peer transfers, Nn1(K), being greater than said number of transfers, N(K), for said selected storage device identified by said identification number K, reassign said selected storage device identified by said identification number, K, to said second peer, recalculate said first peer latency, T1, for said those of said one or more storage devices assigned to said first peer, recalculate said second peer latency, T2, for said those of said one or more storage devices assigned to said second peer and return to step 526; and
(546) in response to said first peer transfer number, Nn1(K), being less than or equal to said number of transfers, N(K), for said selected storage device identified by said identification number K, reassign said number of first peer transfers Nn1(K) of said selected storage device identified by said identification number, K, to said second peer.

16. The article of manufacture of claim 9, wherein the method steps further comprise the steps of:
measuring a first amount of elapsed time for said transferring all data from said first peer to said one or more storage devices assigned to said first peer;
measuring a second amount of elapsed time for said transferring all data from said second peer to said one or more storage devices assigned to said second peer;
recalculating said first average latency, AL1(L), by use of said first amount of elapsed time with a moving weighted average calculation for each of said one or more storage devices assigned to said first peer; and
recalculating said second average latency, AL2(L), by use of said second amount of elapsed time with said moving weighted average calculation for each of said one or more storage devices assigned to said second peer.

17. A data storage system comprising:
one or more storage devices;
a storage management device for providing access to said one or more storage devices;
a first peer for transferring data to said one or more storage devices;
a second peer for transferring data to said one or more storage devices, wherein said first peer and said second peer are programmed to perform method steps for said first peer and said second peer to maintain an optimized balance of a plurality of data transfers to said one or more storage devices, comprising the steps of
(303) calculating a number of transfers, N(L), for each of said one or more storage devices;
(304) calculating a first average latency, AL1(L), for each of said one or more storage devices for said first peer;
(305) calculating a second average latency, AL2(L), for each of said one or more storage devices for said second peer;
(307) calculating an absolute value of the difference of said first average latency and said second average latency for each of said one or more storage devices;
(315) assigning as equal latency storage devices those of said one or more storage devices that have said absolute value less than or equal to a latency threshold;
(325) assigning those of said one or more storage devices to said first peer that have said second average latency more than the sum of said first average latency and said latency threshold;
(330) assigning those of said one or more storage devices to said second peer that have said first average latency more than the sum of said second average latency and said latency threshold;
(340) calculating a first peer latency, T1, for said those of said one or more storage devices assigned to said first peer;
(343) calculating a second peer latency, T2, for said those of said one or more storage devices assigned to said second peer;
(345) calculating a equal latency, Teq, for said those of said one or more storage devices assigned as equal latency storage devices;
(350) calculating a latency difference, Td, between said first peer latency, T1, and said second peer latency, T2, and calculating an absolute value of said latency difference, Td;
(355) in response to said absolute value of said latency difference being greater than said equal latency, Teq, reassigning said those of said one or more storage devices assigned to said first peer and said those of said one or more storage devices assigned to said second peer to said first peer and said second peer so that said absolute value of said latency difference when recalculated with said reassignment of said those of said one or more storage devices assigned to said first peer and said those of said one or more storage devices assigned to said second peer to said first peer and said second peer is less than or equal to said equal latency, Teq;
(357) reassigning said those of said one or more storage devices assigned as equal latency storage devices to said first peer and said second peer to minimize said absolute value of said latency difference, Td; and
(360) transferring all data from said first peer to said one or more storage devices assigned to said first peer and transferring all data from said second peer to said one or more storage devices assigned to said second peer.

18. The system of claim 17, wherein step 357 further comprises:
  in response to said second peer latency, T2, being greater than or equal to said first peer latency, T1 performing the following steps:
  (420) calculating a first equal latency, Tne1, where Tne1=(T2−T1+Teq)/2;
  (425) selecting one of said one or more storage devices assigned as equal latency storage devices and obtaining an identification number I for said selected storage device;
  (430) calculating a number of first equal transfers, Nne1(I), for said selected storage device identified by said identification number I, where Nne1(I)=Tne1/AL1(I);
  (440) in response to said number of first equal transfers Nne1(I) being more than said number of transfers N(I) for said selected storage device identified by said identification number I, reassign said selected storage device identified by said identification number, I, to said first peer, recalculate first equal latency, Tne1, to remove the latency of said selected storage device identified by said identification number, I, and return to step 425;
  (445) in response to said number of first equal transfers Nne1(I) being less than or equal to said number of transfers N(I) for said selected storage device identified by said identification number I, reassign said number of first equal transfers Nne1(I) to said selected storage device identified by said identification number, I, to said first peer; and
  (447) reassign to said second peer those of said one or more storage devices assigned as equal latency storage devices not assigned to said first peer.

19. The system of claim 18, wherein step 425 further comprises:
  selecting one of said one or more storage devices assigned as equal latency storage devices that has the largest first average latency, AL1(I), and obtaining an identification number, I, for said selected storage device.

20. The system of claim 17, wherein step 357 further comprises:
  in response to said first peer latency, T1 being greater than said second peer latency, T2, performing the following steps:
  (421) calculating a second equal latency, Tne2, where Tne2=(T1−T2+Teq)/2;
  (426) selecting one of said one or more storage devices assigned as equal latency storage devices and obtaining an identification number, I, for said selected storage device;
  (431) calculating a number of second equal transfers, Nne2(I), for said selected storage device identified by said identification number, I, where Nne2(I)=Tne2/AL2(I);
  (441) in response to said number second equal transfers, Nne2(I), being more than said number of transfers, N(I), for said selected storage device identified by said identification number I, reassign said selected storage device identified by said identification number I to said second peer, recalculate Tne2, to remove the latency of said selected storage device identified by said identification number, I, and return to step 426;
  (446) in response to said number of second equal transfers, Nne2(I), being less than or equal to said number of transfers, N(I), for said selected storage device identified by said identification number I, assign said number of second equal transfers, Nne2(I), of said selected storage device identified by said identification number, I, to said second peer; and
  (448) reassign to said first peer those of said one or more storage devices assigned as equal latency storage devices not assigned to said second peer.

21. The system of claim 20, wherein step 426 further comprises:
  selecting one of said one or more storage devices assigned as equal latency storage devices that has the largest second average latency, AL2(I), and obtaining an identification number, I, for said selected storage device.

22. The system of claim 17, wherein step 355 further comprises:
  in response to said second peer latency, T2, being greater than said first peer latency, T1, performing the following steps:
  (520) calculating a first latency ratio, R1(L), for each of said one or more storage devices assigned to said second peer, where R1(L)=AL1(L)/AL2(L);
  (525) selecting one of said one or more storage devices assigned to said second peer that has the smallest of said first latency ratio, R1(L), and obtaining an identification number, K, for said selected storage device;
  (530) calculating a number of second peer transfers, Nn2(K), for said selected storage device identified by said identification number, K, where Nn2(K)=(T2−Teq−T1)/((1+R1(K))*AL2(K));
  (540) in response to said number of second peer transfers, Nn2(K), being greater than said number of transfers, N(K), for said selected storage device identified by said identification number K, reassign said selected storage device identified by said identification number, K, to said first peer, recalculate said first peer latency, T1, for said those of said one or more storage devices assigned to said first peer, recalculate said second peer latency, T2, for said those of said one or more storage devices assigned to said second peer and return to step 525; and
  (545) in response to said number of second peer transfers, Nn2(K), being less than or equal to said number of transfers, N(K), for said selected storage device identified by said identification number K, reassign said number of second peer transfers, Nn2(K), of said selected storage device identified by said identification number, K, to said first peer.

23. The system of claim 17, wherein step 355 further comprises:
  in response to said second peer latency, T2, being less than said first peer latency, T1, performing the following steps:
  (521) calculating a second latency ratio, R2(L), for each of said one or more storage devices assigned to said first peer, where R2(L)=AL2(L)/AL1(L);
  (526) selecting one of said one or more storage devices assigned to said first peer that has the smallest of said latency ratio, R2(L), and obtaining an identification number K for said selected storage device;
  (531) calculating a number of first peer transfers, Nn1(K), for said selected storage device identified by said identification number, K, where Nn1(K)=(T1−Teq−T2)/((+R2(K))*AL1(K));
  (541) in response to said number of first peer transfers, Nn1(K), being greater than said number of transfers, N(K), for said selected storage device identified by said identification number K, reassign said selected storage device identified by said identification number, K, to said second peer, recalculate said first peer latency, T1, for said those of said one or more storage devices assigned to said first peer, recalculate said second peer latency, T2, for said those of said one or more storage devices assigned to said second peer and return to step 526; and (546) in response to said first peer transfer number, Nn1(K), being less than or equal to said number of transfers, N(K), for said selected storage device identified by said identification number K, reassign said number of first peer transfers Nn1(K) of said selected storage device identified by said identification number, K, to said second peer.

24. The system of claim 17, further comprising the additional steps of:

measuring a first amount of elapsed time for said transferring all data from said first peer to said one or more storage devices assigned to said first peer;

measuring a second amount of elapsed time for said transferring all data from said second peer to said one or more storage devices assigned to said second peer;

recalculating said first average latency, AL1(L), by use of said first amount of elapsed time with a moving weighted average calculation for each of said one or more storage devices assigned to said first peer; and recalculating said second average latency, AL2(L), by use of said second amount of elapsed time with said moving weighted average calculation for each of said one or more storage devices assigned to said second peer.

* * * * *